(12) United States Patent
Nishida

(10) Patent No.: US 8,310,506 B2
(45) Date of Patent: Nov. 13, 2012

(54) OPTICAL DISK DEVICE

(75) Inventor: Yusuke Nishida, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 654 days.

(21) Appl. No.: 12/244,366

(22) Filed: Oct. 2, 2008

(65) Prior Publication Data

US 2009/0091584 A1   Apr. 9, 2009

(30) Foreign Application Priority Data

Oct. 5, 2007   (JP) .................................. 2007-262287

(51) Int. Cl.
   *G09G 5/00*   (2006.01)
(52) U.S. Cl. ........................................ 345/660; 345/635
(58) Field of Classification Search ........................ None
   See application file for complete search history.

(56) References Cited

U.S. PATENT DOCUMENTS

| | | | |
|---|---|---|---|
| 7,978,920 B2* | 7/2011 | Okazaki et al. ............... | 382/233 |
| 2003/0117419 A1* | 6/2003 | Hermanson ................... | 345/660 |

FOREIGN PATENT DOCUMENTS

| JP | 2001175212 A | * | 6/2001 |
|---|---|---|---|
| JP | 2003219320 | | 7/2003 |
| JP | 2005236707 | | 9/2005 |
| JP | 2005236707 A | * | 9/2005 |

* cited by examiner

*Primary Examiner* — Joni Hsu
*Assistant Examiner* — Michelle Chin
(74) *Attorney, Agent, or Firm* — Pillsbury Winthrop Shaw Pittman, LLP

(57) ABSTRACT

This output device includes a read means which reads in image data of a first aspect ratio from an input port or from a medium. Moreover, this output device includes an image synthesis means which creates combined image data of a second aspect ratio by adding mask bands at the sides of, or above and below, an image which is based upon the image data of said first aspect ratio. Furthermore, this output device includes an output means which outputs this combined image data at said second aspect ratio. And the output means is connected to a display device which processes said combined image data which has been outputted at said second output ratio, and displays the result upon a screen. Moreover, the image synthesis means changes the color of said mask bands to a different color at a predetermined timing during a predetermined time period.

7 Claims, 5 Drawing Sheets

OPTICAL DISK DEVICE

CROSS REFERENCE

This Nonprovisional application claims priority under 35 U.S.C. §119(a) on Patent Application No. 2007-262287 filed in Japan on Oct. 5, 2007, the entire contents of which are hereby incorporated by reference.

BACKGROUND OF THE INVENTION

The present invention relates to an output device which creates combined image data of a second aspect ratio by adding bands to image data of a first aspect ratio, and more particularly relates to such an output device which is connected to a display device which processes this combined image data and displays the resulting image upon a screen.

In recent years, increase of the width of the screen display of a television, a PC, or the like has progressed rapidly, and wide displays which have screens of 16:9 aspect ratio are being sold in very large numbers in the market. And output devices such as CATV receivers and DVD players and the like which are compatible with such wide displays are also being sold in very large numbers.

Here, a DVD player will be explained as a representative of such output devices. When the image data recorded upon a DVD is at an aspect ratio of 16:9, such a DVD player outputs the image data as a wide display, just as it is. Due to this, the image is displayed as a wide display at the aspect ratio of 16:9. On the other hand, if image data at the aspect ratio of 4:3 is recorded upon a DVD, the DVD player outputs a wide display by creating a combined image at the aspect ratio of 16:9, in which black colored mask bands are added to the left and right sides of an image at the aspect ratio of 4:3. As a result, a combined image at the aspect ratio of 16:9 is displayed as a wide display. In this manner, in recent years, the number of cases has been steadily increasing in which the user views a combined image at the aspect ratio of 16:9, even though the image data is recorded upon a DVD at the aspect ratio of 4:3.

It should be understood that inventions of display devices which display combined images of the above described type are disclosed in Japanese Laid-Open Patent Publication 2003-219320 and Japanese Laid-Open Patent Publication 2005-236707.

However, with a display device such as a plasma display panel (PDP) or the like, in a similar manner to the case with a CRT or the like, due to the relationship between the usage of the phosphor and its light emitting characteristics, so called "burning" may be caused upon the screen of the display device. Burning appears more and more prominently, if the same screen is displayed for a long time period, in proportion to time period that such display is performed. Accordingly, if a combined image is displayed in wide display at an aspect ratio of 16:9 for a long period of time, then the portions where the mask bands appear sometimes undergo burning, which is undesirable. As a result the problem occurs that, when an image of aspect ratio 16:9 is displayed in wide display, the portions where these mask bands were located stand out prominently due to the differences in their luminance levels.

The object of the present invention is to provide an output device with which, by adjusting the signal for the combined image which is outputted to the display device, it is possible to prevent burning of the portions where the mask bands are located.

SUMMARY OF THE INVENTION

The output device according to the present invention includes a read means which reads in image data of a first aspect ratio from an input port or from a medium. This output device may be a broadcast reception device which reads in image data included in a broadcast television program from a tuner, or a personal computer which reads in image data upon the internet from a LAN card, or a replay device which reads in image data from a medium. Said medium may be, for example, a hard disk, a semiconductor memory, or an optical disk.

Furthermore, this output device includes an image synthesis means which creates combined image data of a second aspect ratio by adding mask bands at the sides of, or above and below, an image which is based upon said image data of said first aspect ratio read in by said read means. Moreover, this output device includes an output means which outputs this combined image data at said second aspect ratio which has been synthesized by said image synthesis means.

And this output means is connected to a display device which processes said combined image data which has been outputted at said second output ratio, and displays the result upon a screen. With this structure, this display device may be, for example, a liquid crystal television, a PDP monitor or a PDP television. And the first aspect ratio may be, for example, 4:3 or 16:9. And the second aspect ratio may be, for example, 16:9 or 4:3.

Here, if the first aspect ratio is 4:3 and the second aspect ratio is 16:9, then the image synthesis means adds mask bands (which may be, for example, black in color) on both the sides of the image. In this case, a combined image including both the image and side bars is displayed upon the display device. Moreover, if the first aspect ratio is 16:9 and the second aspect ratio is 4:3, then the image synthesis means adds mask bands (which may be, for example, black in color) above and below the image. In this case, a combined image including both the image and the upper and lower bars is displayed upon the display device.

And the image synthesis means changes the colors of the mask bands to a different color at a predetermined timing during a predetermined time period.

DETAILED DESCRIPTION OF THE INVENTION

An optical disk device which is an embodiment of the present invention will now be explained with reference to the drawings.

Figure 1:
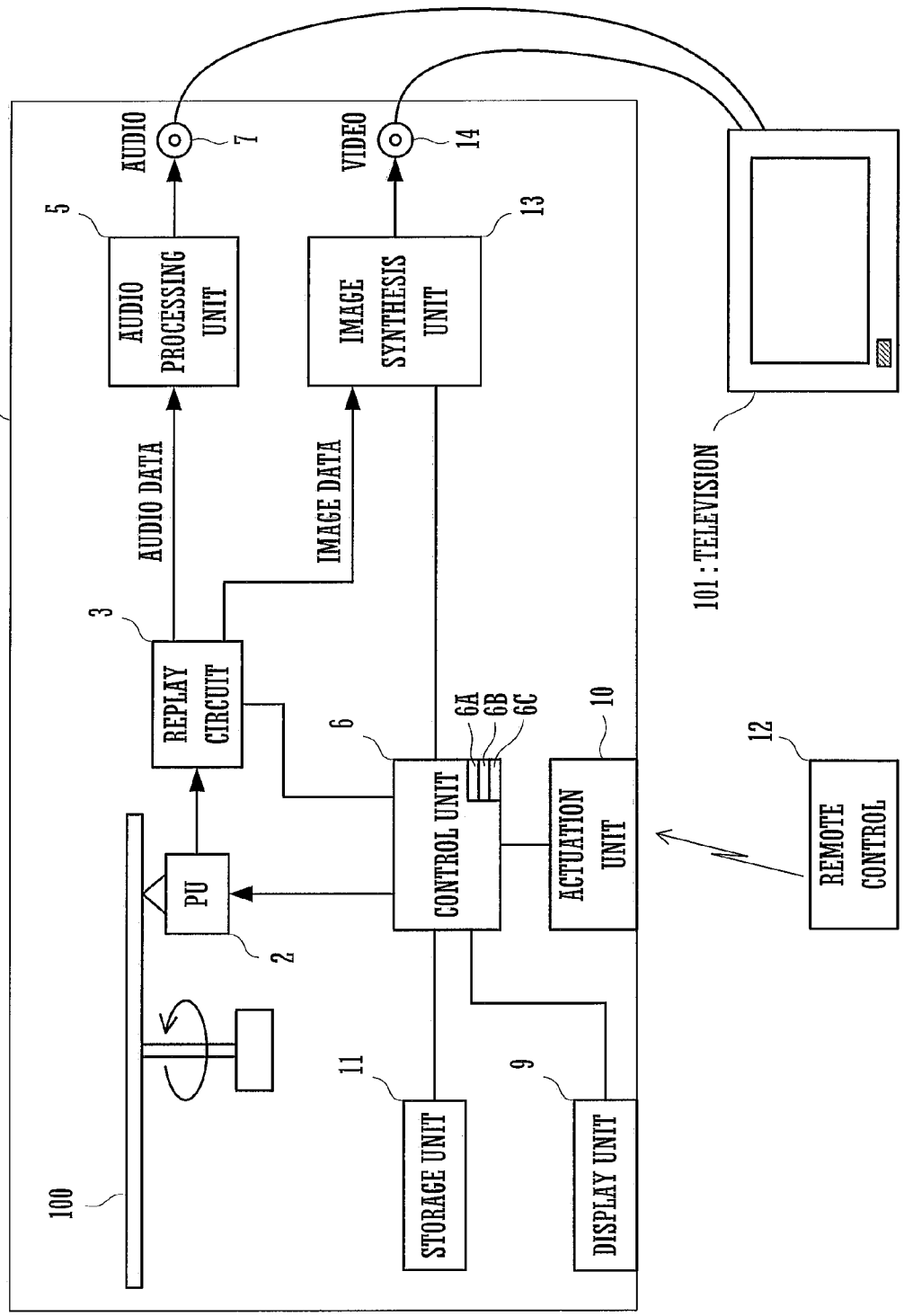
FIG. 1 is a block diagram showing the main structure of an optical disk device which is an embodiment of the present invention.

FIG. 1 is a block diagram showing the main structure of an optical disk device which is an embodiment of the present invention. This optical disk device 1 comprises a control unit 6 which controls the operation of the various sections of the main body 1 of the device, a pickup head 2 (hereinafter termed the "PU head 2") which performs reading of data from a DVD 100, a replay circuit 3 which comprises an RF amp or the like, an actuation unit 10 which receives actuation by a user, and a remote control 12 which remotely actuates the device main body 1. Moreover, this optical disk device 1 comprises a display unit 9 which displays information, a storage unit 11 which stores data, an audio processing unit 5 which outputs audio data as a replay audio signal, and an image synthesis unit 13 which outputs image data as a replay image signal.

This optical disk device 1 is a so called DVD player. And the optical disk device 1 is connected to a television 101 which has a plasma display panel (PDP). Moreover, it will be supposed that a television program which consists of an original program and commercials is recorded in advance upon the DVD 100.

It should be understood that although, in this embodiment, a DVD 100 is used, during actual implementation, this may also be a Blu-ray disk.

The PU head 2 comprises a laser diode (LD), a collimator lens, a beam splitter, an objective lens, a photodetector, a thread motor, and an actuator, none of which are shown in the figures.

The PU head 2 is fitted upon a shaft which extends along the radial direction of the DVD 100, so as to be capable of shifting freely. And the thread motor shifts the PU head 2 along the radial direction of the DVD 100. The LD is a light source which outputs laser light. And the photodetector is formed from a plurality of light reception elements, and detects light reflected back from the DVD 100.

The operation during replay will now be explained.

The PU head 2 irradiates laser light of read power upon the DVD 100, and detects the light reflected back from the DVD 100 with the photodetector. By doing this, the information which is recorded upon the DVD 100 is optically read out.

The replay circuit 3 generates an RF signal on the basis of the outputs of the plurality of light reception elements, and amplifies this RF signal. And the replay circuit 3 processes this RF signal and extracts image data and audio data from it. Here, this data for the images and the audio which is extracted is encoded, for example, by MPEG. And the replay circuit 3 decodes this data. Then the replay circuit 3 outputs the audio data to the audio processing unit 5 and the image data to the image synthesis unit 13, while maintaining synchronization between these data streams.

The audio processing unit 5 outputs the audio data from the audio output terminal 7 to the television 101 as a replay audio signal.

On the basis of a command from the control unit 6, the image synthesis unit 13 creates a combined image by adding mask bands of a color which has been commanded to the left and right sides of, or above and below, an image which is based upon the image data outputted from the replay circuit 3. For example, if the screen display mode is set to "side bars", then the image synthesis unit 13 may create a combined image by adding black colored side bars on both sides of the image which is based upon the image data outputted from the replay circuit 3.

And the image synthesis unit 13 outputs a signal for this combined image from the image output terminal 14 to the television 101 as a replay image signal. Or the image synthesis unit 13 may output the image data which has been outputted from the replay circuit 3 from the image output terminal 14 to the television 101, just as it is, as a replay image signal. Here, operation according to these two patterns is changed over according to commands from the control unit 6.

Figure 2:
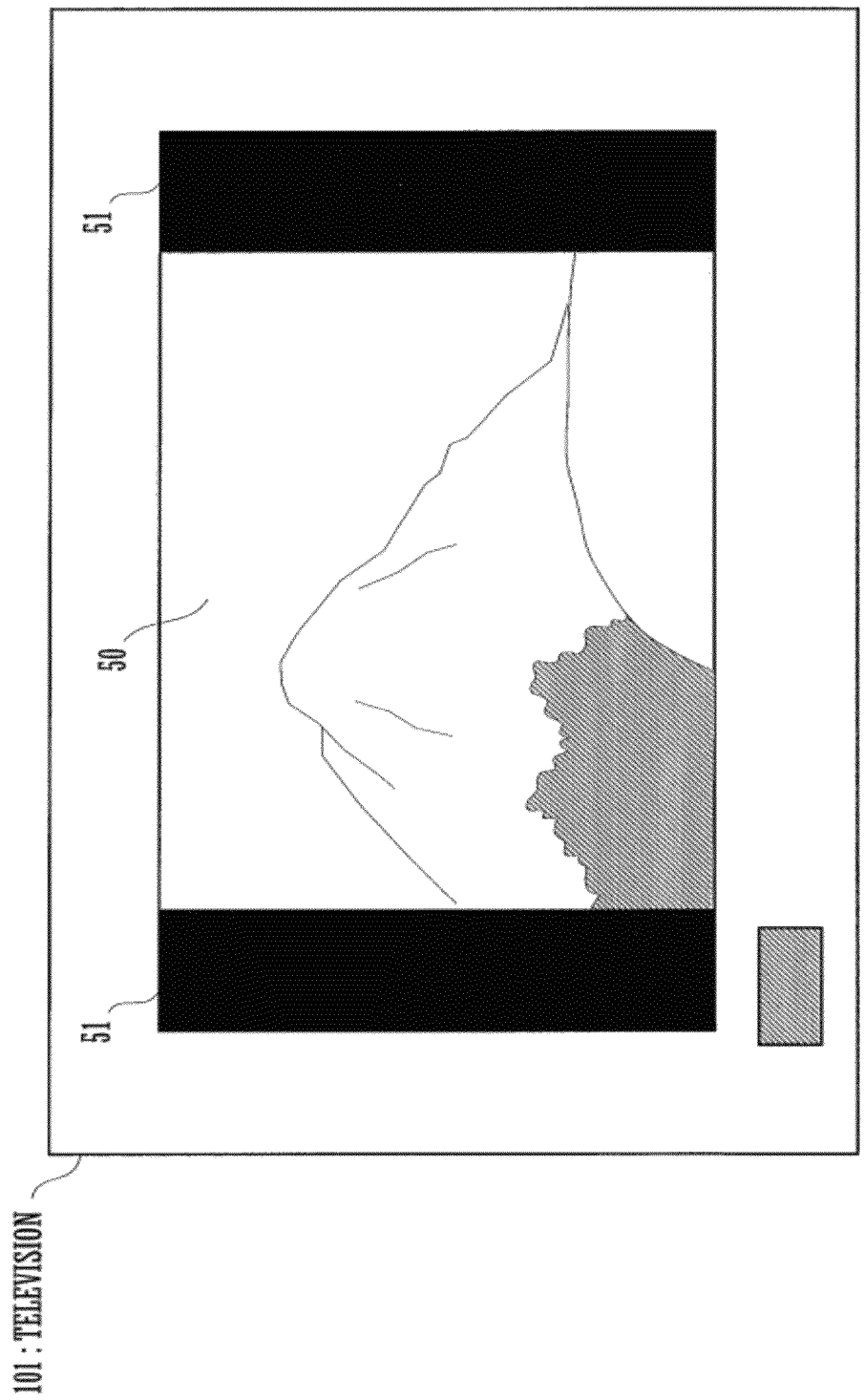
FIG. 2 is a figure showing an example of a screen which is displayed upon a television 101.

The television 101 processes the signals outputted from the optical disk device 1, and displays the image upon its screen while playing back the audio. Due to this, a combined image consisting of an image 50 and two side bars 51 is displayed upon the television 101 (refer to FIG. 2).

Thus, on this television 101, the user is able to view an image which is based upon the replay image signal outputted from the image synthesis unit 13, and to listen to audio which is based upon the replay audio signal outputted from the audio processing unit 5.

The actuation unit 10 is a device for the user to input various types of commands to the optical disk device 1. A plurality of keys which receive actuation by the user are provided to this actuation unit 10. Commands which have been inputted by the user for the optical disk device 1 are transmitted to the control unit 6.

Among this plurality of keys, there are included a replay key for commanding replay of a DVD 100, and a setting key for setting one screen display mode from among a plurality of screen display modes. Here the user sets, with the setting key, one screen display mode from among "side bars" in which black colored mask bands are added on both sides of a 4:3 image, "full" in which the 4:3 image is magnified and converted into a 16:9 image, and "letterbox" in which black colored mask bands are added above and below a 16:9 image. In this embodiment, it will be supposed that "side bars" is set by the user in advance.

Moreover, a remote control signal detection unit (not shown in the figures) is provided to the actuation unit 10. When a command to turn the power supply ON or OFF, to change the channel, to adjust the sound volume, or the like is inputted to this remote control signal detection unit from externally to the device main body by using the remote control 12, then the remote control signal detection unit transmits this command signal which it has received from the remote control 12 to the control unit 6. The remote control 12 is provided with keys which are similar to those upon the actuation unit 10.

The display unit 9 displays the present time instant, the setting state of the optical disk device 1, and the like.

The storage unit 11 may comprise, for example, a hard disk or an EEPROM. This storage unit 11 stores a control program in which methods of control for the various sections of the device main body 1 are specified.

The control unit 6 may, for example, comprise a microcomputer. Moreover, the control unit 6 houses internally a RAM 6A which serves as a working space for holding data which is processed by the control program described above, a timer circuit 6B which measures time, and another timer circuit 6C which measures time. The control unit 6 controls the various sections of the optical disk device 1 according to commands inputted from the user. It should be noted that the details of the timer circuits 6B and 6C will be described hereinafter.

Here, the PU head 2 and the replay circuit 3 correspond to the "read means" of the Claims. Moreover, the actuation unit 10 and the remote control 12 correspond to the "selection means" of the Claims. And the image synthesis unit 13 corresponds to the "image synthesis means" of the Claims. Furthermore, the image output terminal 14 corresponds to the "output means" of the Claims.

Figure 3:
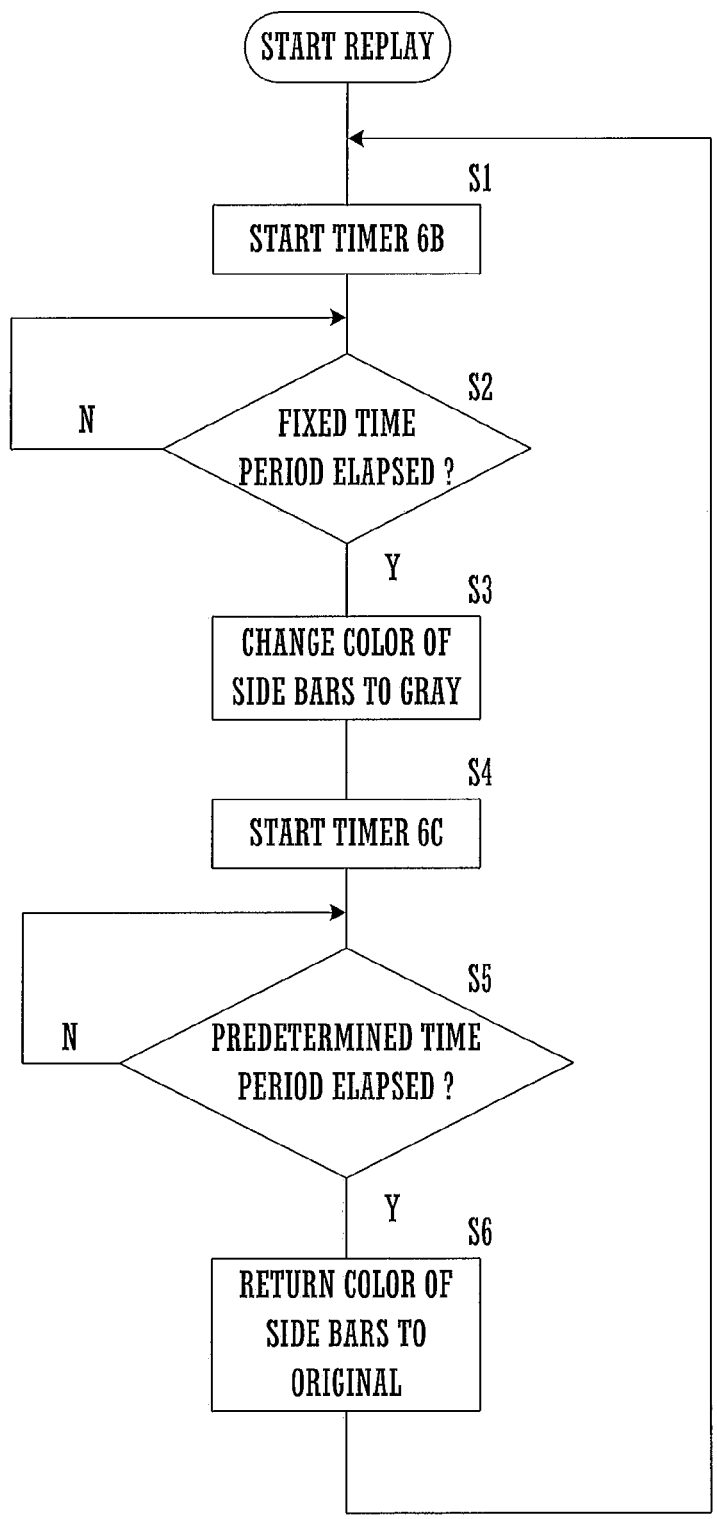
FIG. 3 is a flow chart showing operations performed by a control unit of this optical disk device which is an embodiment of the present invention.

FIG. 3 is a flow chart showing operations performed by the control unit of this optical disk device which is an embodiment of the present invention. These operations are ones when the user depresses a replay key so as to start replay by the optical disk device 1. When replay is interrupted by a stop actuation or the like, the control unit 6 terminates these operations. Furthermore, herein, a scenario is supposed in which, with these operations, the user is replaying a television program which is recorded upon a DVD 100, and is viewing that television program upon the television 101.

When replay is started, the control unit 6 starts measurement of time with the timer circuit 6B (a step S1). And the control unit 6 checks the timer circuit 6B, and waits until a fixed time period has elapsed (a step S2). This fixed time period is a time period which is determined in advance from the point of view of prevention of burning. This fixed time period may be set to, for example, 30 minutes.

Figure 4:
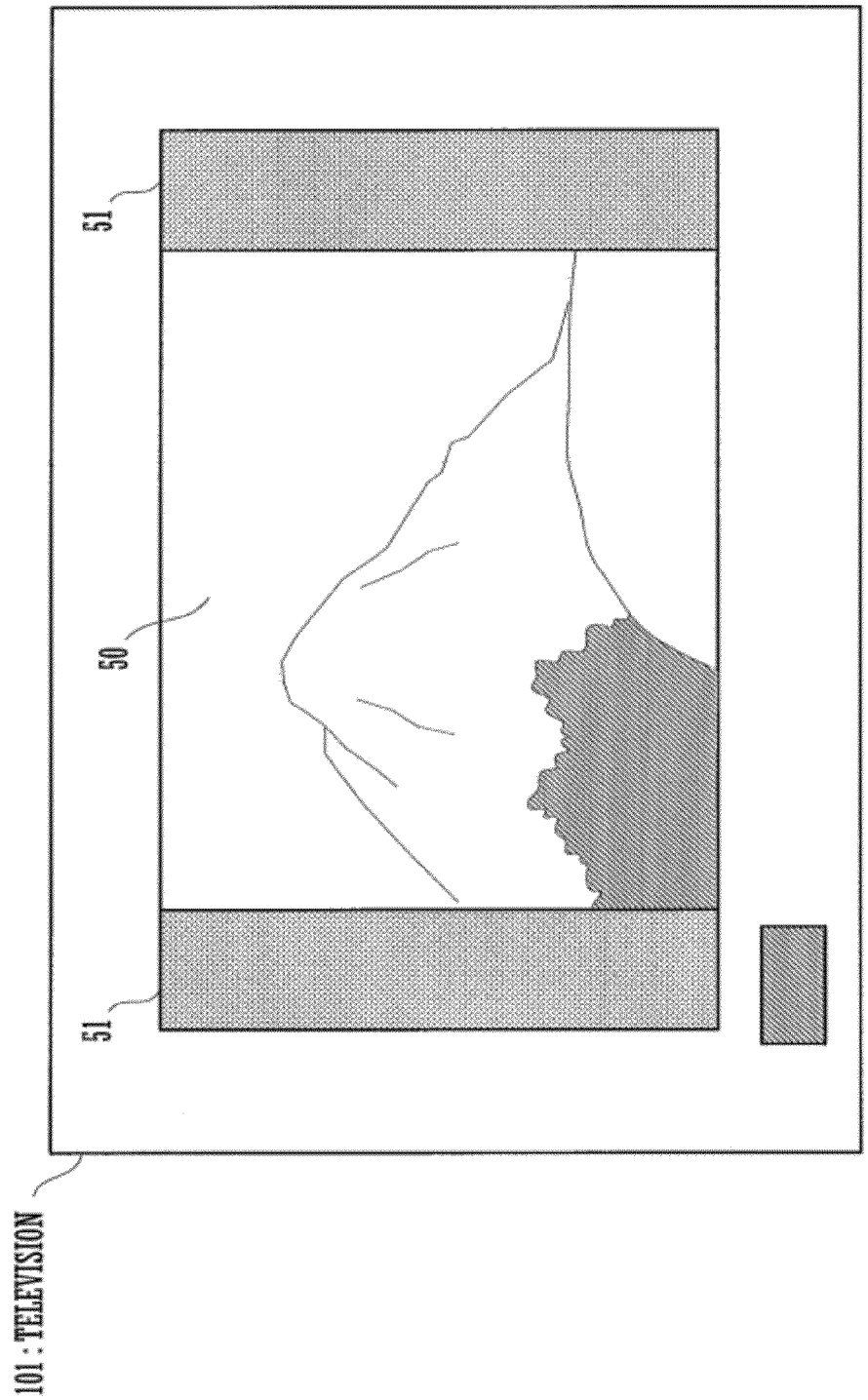
FIG. 4 is a figure showing another example of a screen which is displayed upon the television 101.

When the fixed time period elapses, the control unit 6 commands the image synthesis unit 13 to change the color of the side bars 51 from black color to gray color (a step S3). Due to this, the color of the side bars 51 which are being displayed upon the television 101 changes to gray color (refer to FIG. 4).

And, simultaneously with the command of the step S3, the control unit 6 starts measuring time with the timer circuit 6C (a step S4). And the control unit 6 checks the timer circuit 6C, and waits until a predetermined time period has elapsed (a step S5). Now, if the color of the side bars 51 were to change abruptly, there is a fear that a sense of discomfort would be imparted to the user, and that he might experience stress, which would be undesirable. Thus the predetermined time period is set in advance to a short time period, so that the user is not aware of the change of the color of the side bars 51. This predetermined time period may be set to, for example, 0.1 seconds.

When the predetermined time period elapses, the control unit 6 commands the image synthesis unit 13 to change the color of the side bars 51 from gray color back to black color (a step S6), and then the flow of control returns to the step S1. Due to this, the color of the side bars 51 which are being displayed upon the television 101 changes back to black color (refer to FIG. 2).

Due to the above, with this optical disk device 1, if a combined image of the aspect ratio 16:9 is displayed by the television 101 for a long time period, then the color of the side bars 51 is changed each time the fixed time period elapsed. By doing this, It is possible to prevent the side bars 51 from being displayed over a long time period in the same color. Accordingly, it is possible to prevent burning of the portions where the side bars 51 appear.

Furthermore, the following variations of this embodiment of the present invention may be employed.

<A First Variant Embodiment>

Figure 5:
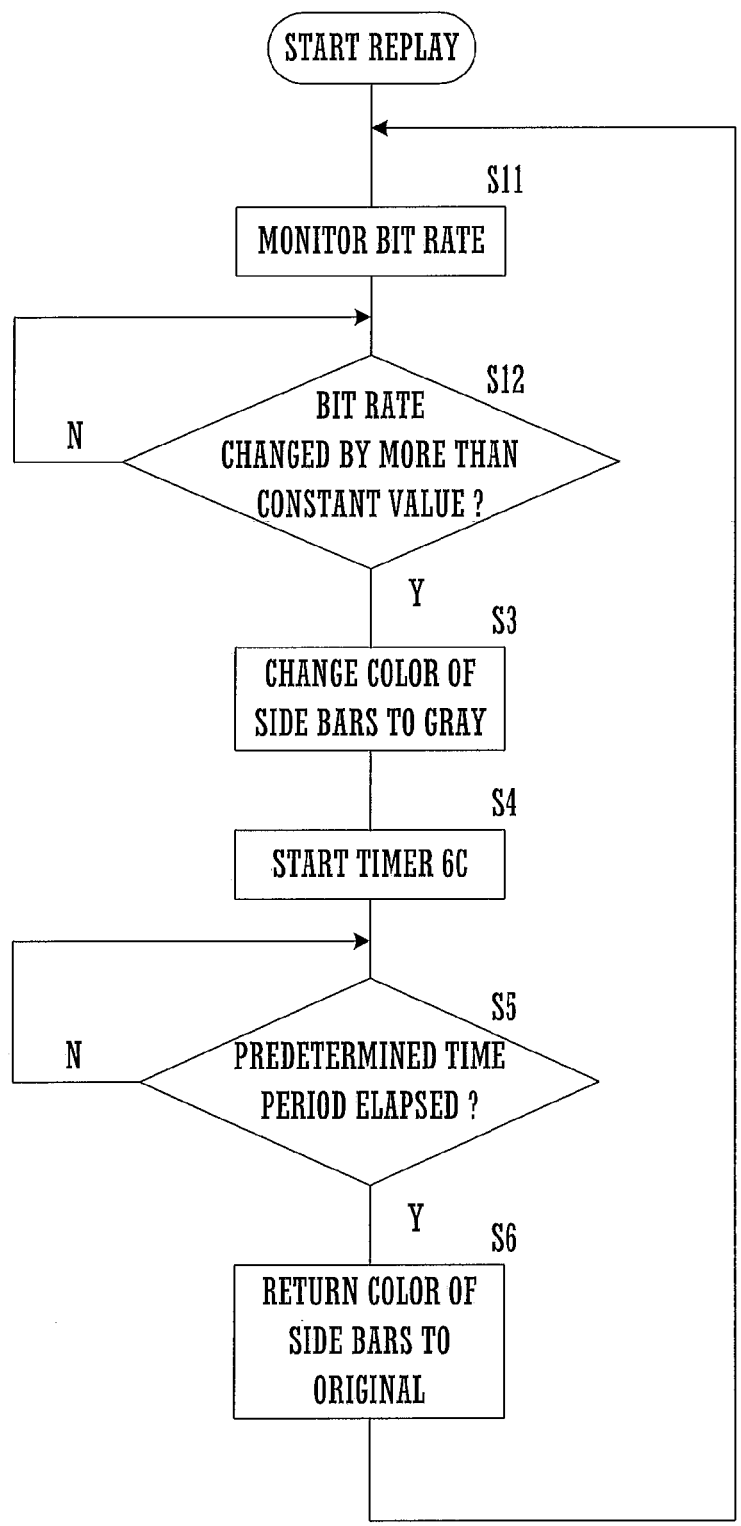
FIG. 5 is a flow chart showing operations performed by a control unit of an optical disk device which is a first variant embodiment of the present invention.

FIG. 5 is a flow chart showing operations performed by a control unit of an optical disk device which is a first variant embodiment of the present invention. Of these operations, the steps S1, S2 in FIG. 3 have been replaced by steps S11 and S12, and the other processing steps are the same. Furthermore it is supposed that, as described above, a television program which consists of an original program and commercials is recorded upon the DVD 100.

During replay of the DVD 100, in a transition where the image 50 changes abruptly, it is difficult for the user to be aware of change of the color of the side bars 51. A transition in which the image 50 changes abruptly may be, for example, a transition from the original program to a commercial, a transition from a commercial back to the original program, a transition from a scene in which the movement is very fast to a scene in which the movement is slow, or a transition from a scene in which the movement is slow to a scene in which the movement is very fast. A scene in which the movement is very fast may be, for example, an action scene.

Thus, the control unit 6 monitors the bit rate of the image data after it has been decoded by the replay circuit 3 (the step S11). And the control unit 6 makes a decision as to whether or not this bit rate has changed by greater than or equal to a constant value (the step S12). This constant value is a value which is set in advance, and which is considered to be a value which means that the image is changing abruptly. This constant value may, for example, be 500 kbps.

If the bit rate changes at greater than or equal to the constant value, then the control unit 6 commands the image synthesis unit 13 to change the color of the side bars 51 to gray color (the step S3). Due to this, the color of the side bars 51 which are being displayed upon the television 101 changes to gray color (refer to FIG. 4).

Due to the above, even though the color of the side bars 51 is changed at the timing at which the bit rate changes, it is possible to prevent the side bars 51 from being displayed in the same color over a long period of time. Accordingly, it is possible to prevent burning of the portions where the side bars 51 are located.

<A Second Variant Embodiment>

The closer to white color is the color to which change is performed in the step S3, the higher is the advantageous effect for prevention of burning, but the easier does it become for the user to be aware of this change of color. Conversely, the closer to black color is the color to which change is performed in the step S3, the lower is the advantageous effect for prevention of burning, but the harder does it become for the user to be aware of this change of color.

Thus, the actuation unit 10 is provided with a selection key for selecting the color of the side bars 51 to one color from among a plurality of colors. And the color for the side bars 51 is selected in advance by the user with this selection key.

Due to this, in the step S3, the control unit 6 commands the image synthesis unit 13 to change the color of the side bars 51 from black color to the selected color. And, by doing this, the color of the side bars 51 which are displayed upon the television 51 is changed to the color which has been selected with the selection key. Accordingly, the user is able to select the color to which the side bars 51 are changed himself, according to his own method of usage.

What is claimed is:

1. An optical disk device, comprising:
   read means which reads in image data of first aspect ratio from an input port or an optical disk;
   image synthesis means which creates combined image data of a second aspect ratio by adding mask bands with a first color at the sides of, or above and below, an image which is based upon the image data of the first aspect ratio read in by the read means; and
   output means which outputs the combined image data at the second aspect ratio which has been synthesized by the image synthesis means;
   wherein:
      the output means is connected to a display device which displays an combined image which is based upon the combined image data which has been outputted at the second output ratio; and
      the image synthesis means changes a color of the mask bands from the first color to a second color which is different from the first color at a timing when the bit rate of the image data read in by the read means changes by greater than or equal to a fixed value.

2. The optical disk device according to claim 1, wherein:
   the first aspect ratio is 4:3;
   the second aspect ratio is 16:9; and
   the image synthesis means creates combined image data of the aspect ratio 16:9 by adding black colored mask bands at the sides of an image at the aspect ratio of 4:3 which is based upon the image data.

3. The optical disk device according to claim 1, wherein the timing occurs at a transition from an original program to a commercial, or a transition from a commercial back to the original program.

4. The optical disk device according to claim 1, wherein the timing occurs at a transition from a scene in which a movement is very fast to a scene in which a movement is slow, or a transition from a scene in which a movement is slow to a scene in which a movement is very fast.

5. The optical disk device according to claim 1 wherein, for the bit rate of the image data changing by greater than or equal to the fixed value, the second color becomes less different in color to the first color when an amount of bit rate change is small while the second color becomes more different in color from the first color when the amount of bit rate change is large.

6. The optical disk device according to claim 1, wherein the image synthesis means changes the color of the mask bands from the first color to the second color during a predetermined time period, at a timing when the bit rate of the image data read in by the read means changes by greater than or equal to the fixed value.

7. The optical disk device according to claim 1, further comprising selection means for selecting one color from among a plurarity of colors as the second color.

\* \* \* \* \*